United States Patent
Donovan et al.

(10) Patent No.: US 7,151,822 B2
(45) Date of Patent: *Dec. 19, 2006

(54) METHOD AND SYSTEM FOR RELEASING A VOICE RESPONSE UNIT FROM A PROTOCOL SESSION

(75) Inventors: Steven R. Donovan, Richardson, TX (US); Matthew Cannon, Herndon, VA (US); John Hearty, Denver, CO (US)

(73) Assignee: MCI, LLC, Basking Ridge, NJ (US)

( * ) Notice: Subject to any disclaimer, the term of this patent is extended or adjusted under 35 U.S.C. 154(b) by 25 days.

This patent is subject to a terminal disclaimer.

(21) Appl. No.: 10/867,869

(22) Filed: Jun. 15, 2004

(65) Prior Publication Data

US 2004/0223490 A1 Nov. 11, 2004

Related U.S. Application Data

(63) Continuation of application No. 10/022,099, filed on Dec. 18, 2001, now Pat. No. 6,816,579, which is a continuation of application No. 09/441,438, filed on Nov. 17, 1999, now Pat. No. 6,512,818.

(51) Int. Cl.
  *H04M 1/64* (2006.01)
  *H04M 11/00* (2006.01)
  *H04L 12/66* (2006.01)
(52) U.S. Cl. ............... 379/88.17; 379/88.18; 370/352; 370/356
(58) Field of Classification Search ............. 370/352, 370/356; 379/67.1, 70, 88.13, 88.17, 88.18, 379/92.03, 92.13, 265.09, 900

See application file for complete search history.

(56) References Cited

U.S. PATENT DOCUMENTS

| | | | |
|---|---|---|---|
| 5,309,504 A | 5/1994 | Morganstein | |
| 5,345,501 A | 9/1994 | Shelton | |
| 5,652,785 A | 7/1997 | Richardson | |
| 5,790,174 A | 8/1998 | Richard, III et al. | |
| 5,802,526 A | 9/1998 | Fawcett et al. | |
| 5,884,032 A | 3/1999 | Bateman et al. | |
| 5,963,618 A * | 10/1999 | Porter | 704/270.1 |
| 5,987,118 A | 11/1999 | Bartels et al. | |
| 6,018,579 A | 1/2000 | Petrunka | |
| 6,049,602 A | 4/2000 | Foladare et al. | |
| 6,097,804 A | 8/2000 | Gilbert et al. | |
| 6,122,364 A | 9/2000 | Petrunka et al. | |
| 6,134,235 A | 10/2000 | Goldman et al. | |
| 6,137,870 A | 10/2000 | Scherer | |
| 6,195,357 B1 | 2/2001 | Polcyn | |
| 6,215,783 B1 | 4/2001 | Neyman | |

(Continued)

FOREIGN PATENT DOCUMENTS

WO 99/34612 7/1999

*Primary Examiner*—Bing Q. Bui

(57) ABSTRACT

An approach for processing voice calls over a packet switched network as to efficiently utilize the functionalities of a Voice Response Unit (VRU). According to one embodiment, a call originator, acting as a User Agent Client in accordance with the Session Initiation Protocol (SIP), issues messages to establish a first call-leg with the VRU. The VRU performs digit collection to obtain information to authenticate the call originator and to authorize the voice call. Based upon the issued messages from the call originator, the VRU establishes a second call-leg with the call terminator. The VRU is released from the voice call after binding the call-legs to connect the call originator to the call terminator.

23 Claims, 8 Drawing Sheets

U.S. PATENT DOCUMENTS

| | | | |
|---|---|---|---|
| 6,282,270 B1 * | 8/2001 | Porter ..................... 379/88.17 |
| 6,314,176 B1 | 11/2001 | Gunasekar |
| 6,366,658 B1 | 4/2002 | Bjornberg et al. |
| 6,438,601 B1 | 8/2002 | Hardy |
| 6,512,818 B1 | 1/2003 | Donovan et al. |
| 6,594,269 B1 | 7/2003 | Polcyn |
| 6,598,078 B1 | 7/2003 | Ehrlich et al. |
| 6,636,587 B1 | 10/2003 | Nagai et al. |
| 6,704,394 B1 * | 3/2004 | Kambhatla et al. ........ 379/67.1 |
| 6,807,254 B1 * | 10/2004 | Guedalia et al. ........... 379/88.1 |

* cited by examiner

METHOD AND SYSTEM FOR RELEASING A VOICE RESPONSE UNIT FROM A PROTOCOL SESSION

RELATED APPLICATIONS

The present application is a continuation of U.S. patent application Ser. No. 10/022,099, filed Dec. 18, 2001 now U.S. Pat. No. 6,816,579, which is a continuation of U.S. application Ser. No. 09/441,438, filed Nov. 17, 1999, issued as U.S. Pat. No. 6,512,818.

BACKGROUND OF THE INVENTION

1. Field of the Invention

The present invention relates to call processing and is more particularly related to establishing a voice call over a packet switched network via a voice response unit.

2. Discussion of the Background

The popularity and convenience of the Internet has resulted in the reinvention of traditional telephony services. These services are offered over a packet switched network with minimal or no cost to the users. IP (Internet Protocol) telephony, thus, have found significant success, particularly in the long distance market. In general, IP telephony, which is also referred to as Voice-over-IP (VOIP), is the conversion of voice information into data packets that are transmitted over an IP network. Users also have turned to IP telephony as a matter of convenience in that both voice and data services are accessible through a single piece of equipment, namely a personal computer. The continual integration of voice and data services further fuels this demand for IP telephone applications.

With the growing acceptance of IP telephony among the millions of consumers, service providers are cognizant of the impact that these users have on network capacity (e.g., switch sizing, line capacity) as well as network resources (e.g., peripheral voice processing devices). A valuable network resource is the voice response unit (VRU), which provides announcement and interactive voice response functions. These functions have become essential for the expedient treatment of voice calls, especially in call center applications and operator assistance. Because VRU ports are expensive, it is desirable to ensure efficient use of such ports.

FIG. 8 illustrates a conventional IP telephony system. In this system 800, an end office 801 houses a switch 803 and a VRU 805; the switch 803 communicates with the VRU over a release line trunk (RLT). Switch 803 serves user 807 to a public switch telephone network (PSTN) 809. The VRU 805 is not functionally integrated with the IP network 815. That is, the VRU 805 works primarily in conjunction with the switch 803 within the PSTN realm. Using plain old telephone service (POTS), a calling party 807 can place a telephone call over PSTN 809 to a called party 811 or 813.

The PSTN 809 is connected to an IP (Internet Protocol) network 815, thereby enabling communication among the voice stations 807, 811, and 813, which are connected to the public switch telephone network 809, and the personal computers 817 and 819, which are attached to the IP network 815. Attention is now drawn to transmission of voice calls over the IP network 815.

Four possible scenarios exist with the placement of a VOIP call: (1) phone-to-phone, (2) phone-to-PC, (3) PC-to-phone, and (4) PC-to-PC. In the first scenario of phone-to-phone call establishment, voice station 807 is switched through PSTN 809 by switch 803 to a VOIP gateway (not shown), which forwards the call through the IP network 815. The packetized voice call is then routed through the IP network 815, exiting the IP network 815 at an appropriate point to enter PSTN 809 and terminates at voice station 811. Under the second scenario, voice station 807 places a call to personal computer (PC) 817 through switch 803 to PSTN 809. This voice call is then switched by the PSTN 809 to a VOIP gateway (not shown), which forwards the voice call to PC 817 via IP network 815. The third scenario involves PC 817 placing a call to voice station 813, for example. Using a voice encoder, PC 817 introduces a stream of voice packets into IP network 815 that are destined for a VOIP gateway (not shown). A VOIP gateway (not shown) converts the packetized voice information into a POTS electrical signal, which is circuit switched to voice station 813. Lastly, in the fourth scenario, PC 817 establishes a voice call with PC 819. In this case, packetized voice data is transmitted from PC 817 via IP network 815 to PC 819, where the packetized voice data is decoded.

As indicated above, a network resource that permits the efficient processing of voice calls is a VRU 805. FIG. 9 shows a conventional call path that is established by switch 803 to VRU 805. RLT links 901 connect switch 803 to VRU 805, consuming two ports of each of these network components 803 and 805. RLT links 901 enable the release of a call back to switch 803 from VRU 805. This releasing functionality allows the VRU 805 to be dropped from the voice call without impacting the call completion between call originator 903 and call terminator 905.

For explanatory purposes, it is assumed that a VRU 805 is needed to assist with call processing from call originator 903 (i.e., calling party) to call terminator 805 (i.e.. called party). Call originator 903 places a voice call to switch 803 using port 1. In turn, the switch 803 switches the call out of port 3 to port 1 of VRU 805. Once this call is established with VRU 805, the VRU 805 prompts the call originator 903, for example, to collect digits regarding account codes or billing information in order to authorize and validate the call originator 903. After this process, the VRU 805 loops the voice call back to the switch 803 via port 2 over RLT 901 into port 4 of switch 803. Switch 803 then switches the call out of port 2 to call terminator 905. The RLT links 901 permits the VRU 805 to drop out of the call when the call is completed between call originator 903 and call terminator 905. This release mechanism occurs over the PSTN 809. Such a mechanism is important because it frees up the VRU 805 to process other calls; in addition, the switch 803 frees up two of its ports. An equivalent functionality is desirable in an IP telephony system.

Based on the foregoing, there is a clear need for improved approaches for call processing with respect to use of network resources.

There is also a need to increase the integration of voice services over a data network.

There is a further need to minimize the cost of network operation.

Based on the need to efficiently employ network resources, an approach for optimizing the use of VRU in an IP telephony environment is highly desirable.

SUMMARY OF THE INVENTION

According to one aspect of the invention, a method is provided for processing a voice call over a packet switched network between a call originator and a call terminator. The method comprises establishing a first call-leg between the call originator and a voice response unit (VRU) using a menu router that provides call control services according to a signaling protocol. The method also includes establishing a second call-leg between the VRU and the call terminator based upon the signaling protocol. The method further includes binding the first call-leg and the second call-leg to complete the voice call between the call originator and the call terminator, and releasing the voice call from the VRU based upon the signaling protocol. Under this approach, network resources are efficiently utilized, resulting in reduction of network operation costs.

According to another aspect of the invention, a communication system for processing a voice call over a packet switched network comprises a call originator that is configured to initiate and to receive the voice call over the packet switched network. A menu router performs call control services relating to the voice call. A voice response unit (VRU) processes a call setup request from the call originator. A call terminator is configured to process the voice call. The call originator, the call terminator, menu router, and the VRU communicate using a common protocol. The call originator establishes a first call-leg with the VRU via the menu router. The to VRU establishes a second call-leg with the call terminator and drops from the voice call upon binding the first call-leg and the second call-leg. The above arrangement advantageously provides greater integration of voice services over a packet switched network.

In yet another aspect of the invention, a computer-readable medium carrying one or more sequences of one or more instructions for processing a voice call over a packet switched network between a call originator and a call terminator. The one or more sequences of one or more instructions include instructions which, when executed by one or more processors, cause the one or more processors to perform the step of establishing a first call-leg between the call originator and a voice response unit (VRU) using a menu router that provides call control services according to a signaling protocol. Another step comprises establishing a second call-leg between the VRU and the call terminator based upon the signaling protocol. Another step includes binding the first call-leg and the second call-leg to complete the voice call between the call originator and the call terminator. Yet another step includes releasing the voice call from the VRU based upon the signaling protocol. This approach advantageously permits increased network operation efficiency.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

The present invention accomplishes the release of VRU ports upon completion of the VOIP call by utilizing a signaling protocol, such as a Session Initiation Protocol (SIP). A call originator establishes a first call-leg with the VRU, which performs digit collection to obtain, for example, account or billing information from the call originator. Based upon the collected information, the VRU can determine whether the call originator is authorized to place a call. Thereafter, the VRU establishes a second call-leg with the call terminator and drops out of the voice call.

Although the present invention is discussed with respect to the Session Initiation Protocol, it should be appreciated that one of ordinary skill in the art would recognize that the present invention has applicability to other equivalent communication protocols. Further, the discussion below focuses on a call scenario that involves a PC-to-PC call establishment, it is understood that the present invention can be practiced with other call scenarios (e.g., PC-to-phone and phone-to-PC).

Figure 1:
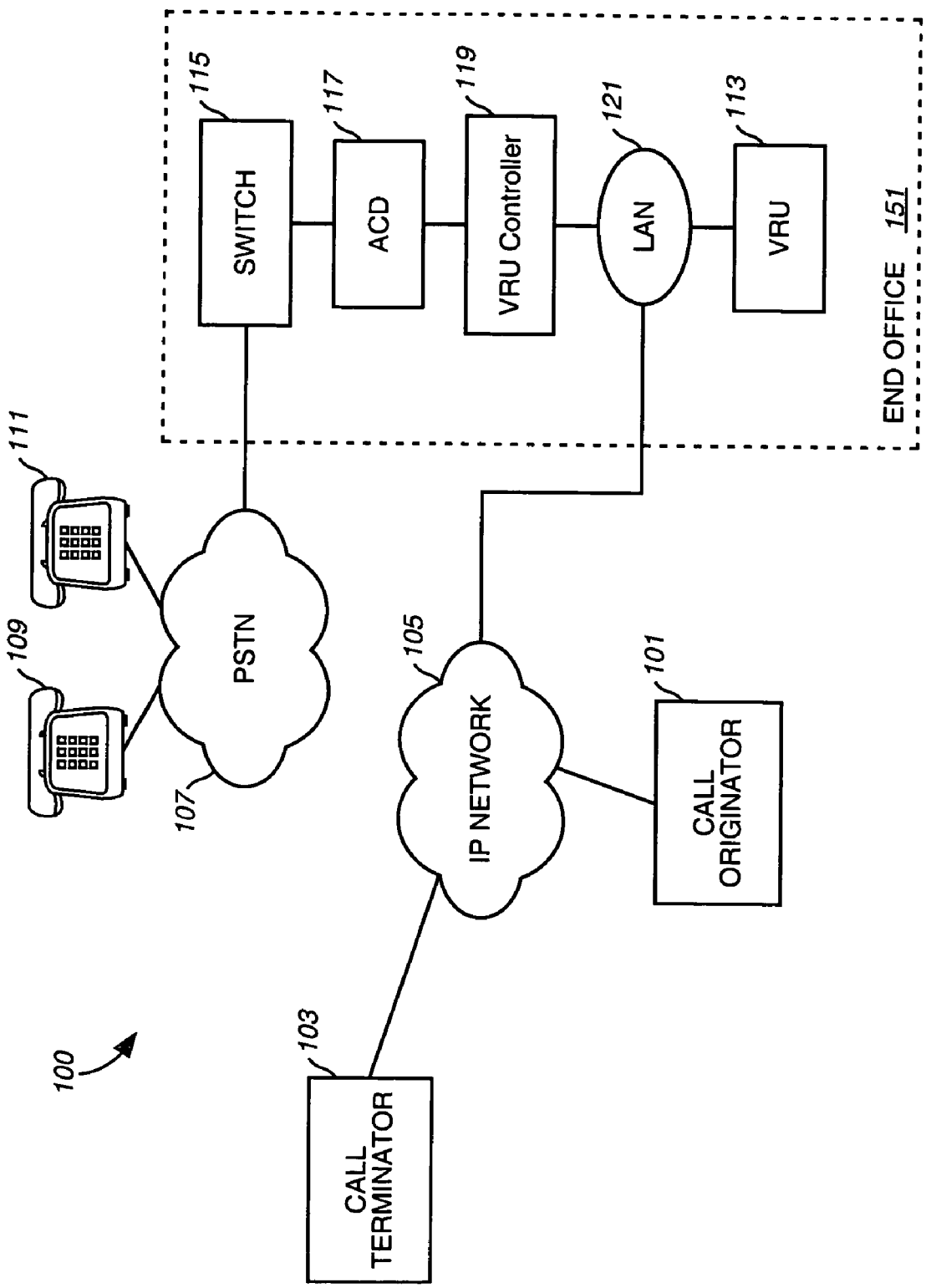
FIG. 1 is a block diagram of an IP telephony system, according to an embodiment of the present invention.

FIG. 1 shows the architecture of a IP telephony system according to one embodiment of the present invention. Although call originator 101 and call terminator 103 are shown to be attached to a IP network 105, it is understood that the call originator 101 and call terminator 103 may be voice stations off the PSTN 107 as well. In general, the call originator 101 and the call terminator 103 may be any device that is capable of processing voice calls; e.g., an analog telephone set, a digital telephone station, or a personal computer that is loaded with the appropriate software and accompanying hardware. Voice communication can be established in the IP telephony system 100 among any of the devices, 101, 103, 109, and 111. However, this particular embodiment is explained only with respect to the communication between call originator 101 and call terminator 103 in conjunction with VRU 113.

As shown in FIG. 1, the end office 151 houses a switch 115, which bridges calls from the PSTN 107 to an automatic call distributor (ACD) 117 via, for example, a release line trunk. A VRU controller 119 is connected to ACD 117 through one or more Switch to Computer Application Interface (SCAI) links. These SCAI links provide communication between ACD 117 and VRU controller 119, which is responsible for selecting a group or a particular agent to which the call is to be routed. In other words, the VRU controller 119 communicates with the ACD 117 for call delivery to the different agents within, for example, an operator center (not shown). The term agent denotes an entity that participates in call processing; e.g., a live person on a manual operator console or a software process. VRU controller 119 further provides such functionalities as coordinating data and voice for operator-assisted calls. A Local Area Network (LAN) 121 permits the VRU controller 119 to communicate with VRU 113. LAN 121 also provides connectivity to IP network 105.

As previously mentioned, call originator 101 and call terminator 103 are PCs that have access to IP network 105. It is assumed that these devices 101 and 103 are appropriately equipped with voice encoders and decoders as well as software to process VOIP calls. In this example, call originator 101 initiates a VOIP call that requires the services of a VRU 113.

VRU 113 provides announcement capability as well as Interactive Voice Response (IVR) capability. In essence, VRU 113 provides an ability to collect various information from and supply announcement information to a calling party (i.e., call originator). In this instance, after the call originator 101 establishes a call-leg with VRU 113 the VRU 113 prompts call originator 101 for a billing code or an account code, thereby enabling the authentication and validation of call originator 101 to authorize the desired voice call. After being granted authorization, the VOIP call from call originator 101 can be completed to call terminator 103 through the IP network 105.

During the call process of the VOIP call from call originator 101 to call terminator 103, it is important that VRU 113 be utilized efficiently. Keeping the VRU 113 in the voice call for the entire call would result in the VRU 113 remaining idle for a significant portion of that voice call, wasting precious network resources. That is, VRU 113 should remain in the voice call only for the duration that it is needed to collect information from call originator 101. To accomplish this task, a suite of protocols are utilized that collectively define IP telephony signaling.

Figure 2:
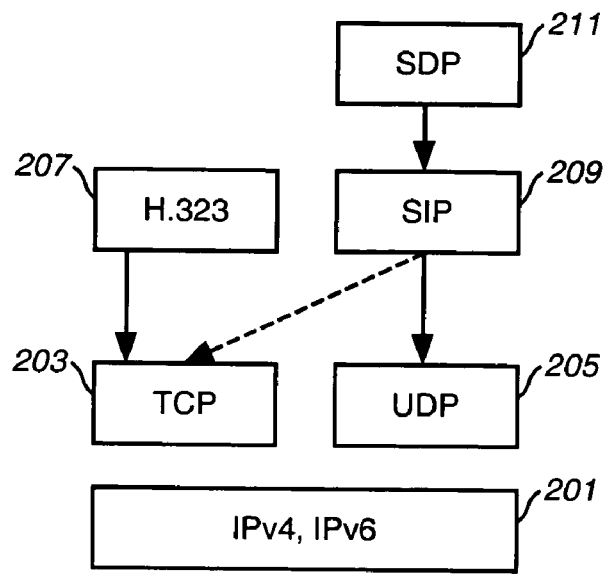
FIG. 2 is diagram of the IP telephony protocol architecture employed by the system of FIG. 1.

FIG. 2 illustrates the IP telephony protocol architecture in accordance with an embodiment of the present invention. The layered nature of the architecture provides protocol separation and independence, whereby one protocol can be exchanged or modified without affecting the other higher layer or lower layer protocols. It is advantageous that the development of these protocols can occur concurrently and independently.

The foundation of the architecture rests with the IP layer 201. The IP layer 201 provides an unreliable, connectionless data delivery service at the network level. The service is "unreliable" in the sense that the delivery is on a "best effort" basis; that is, no guarantees of packet delivery are made. IP is the de facto Internet working protocol standard. Current standards provide two versions of IP: Version 4 and Version 6. One of the key differences between the versions concerns addressing; under Version 4, the address fields are 32 bits in length, whereas in Version 6, the address field has been extended to 128 bits.

Above the IP layer 201 are the TCP (Transmission Control Protocol) 203 and the UDP (User Datagram Protocol) 205. The TCP layer 203 provides a connection-oriented protocol that ensures reliable delivery of the IP packets, in part, by performing sequencing functions. This sequencing function reorders any IP packets that arrive out of sequence. In contrast, the User Datagram Protocol (UDP) 205 provides a connectionless service that utilizes the IP protocol 201 to send a data unit, known as a datagram. Unlike TCP 203, UDP 205 does not provide sequencing of packets, relying on the higher layer protocols to sort the information. UDP 205 is preferable over TCP 203 when the data units are small, which saves processing time because of the minimal reassembly time. One of ordinary skill in the art would recognize that embodiments of the present invention can be practiced using either TCP 203 or UDP 205, as well as other equivalent protocols.

The next layer in the IP telephony architecture of FIG. 2 supplies the necessary IP telephony signaling and includes the H.323 protocol 207 and the Session Initiation Protocol (SIP) 209. The H.323 protocol 207, which is promulgated by the International Telecommunication Union (ITU), specifies a suite of protocols for multimedia communication. SIP 209 is a competing standard that has been developed by the Internet Engineering Task Force (IETF). SIP 209 is a signaling protocol that is based on a client-server model. It should be noted that both the H.323 protocol 207 and SIP 209 are not limited to IP telephony applications, but have applicability to multimedia services in general. In the preferred embodiment of the present invention. SIP 209 is used to create and terminate voice calls over an IP network 105. However, it is understood that one of ordinary skill in the art would realize that the H.323 protocol 207 and similar protocols can be utilized in lieu of SIP 209. Above SIP 209 is the Session Description Protocol (SDP) 211, which provides information about media streams in the multimedia sessions, as to permit the recipients of the session description to participate in the session.

As seen in FIG. 2, SIP 209 can utilize either TCP 203 or UDP 205. However, UDP 205 is adopted in the preferred embodiment of the present invention. Similar to other IETF protocols (e.g., the simple mail transfer protocol (SMTP) and Hypertext Transfer Protocol (HTTP)), SIP 209 is a textual protocol. As indicated earlier, SIP 209 is a client-server protocol, and as such, clients generate requests that are responded to by the servers.

Figure 3:
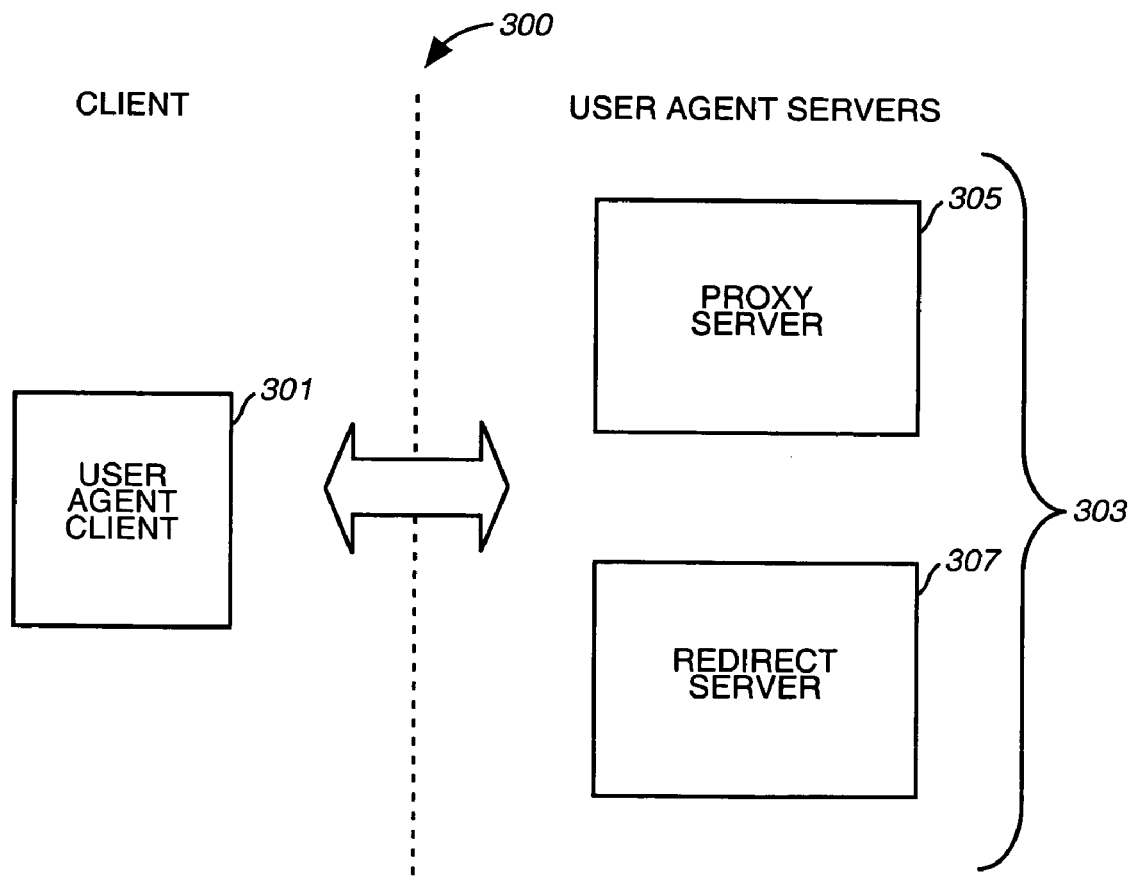
FIG. 3 is a diagram of a Session Initiation Protocol (SIP) model that is used in the system of FIG. 1.

FIG. 3 illustrates the client-server model 300 of SIP 209. On the client side, SIP 209 defines a User Agent Client (UAC), which is responsible for initiating a SIP request. On the server side, a User Agent Server (UAS) 303 receives the SIP request and returns an appropriate response. Both the UAC 301 and the UAS 303 act on behalf of an end user. SIP further defines two types of User Agent Servers: (1) proxy server 305, and (2) redirect server 307.

SIP proxy server 305 receives requests from the UAC 301 and determines the next server that the request should be forwarded. Accordingly, the SIP proxy server 305 sends the request to such a server. During this process of receiving and forwarding, the proxy server 305 behaves both as a client and a server by issuing both requests and responses as appropriate.

In the case of the redirect server 307, the client 301 is given greater responsibility. The redirect server 307 does not forward requests from UAC 301 to the next server, but instead responds back to the client 301 with the address of the next server. The client 301, thus, has the onus of directly communicating with this designated server. Using the SIP client-server model, IP telephony calls can be processed, according to the present invention, to efficiently utilize a Voice Response Unit.

Figure 4:
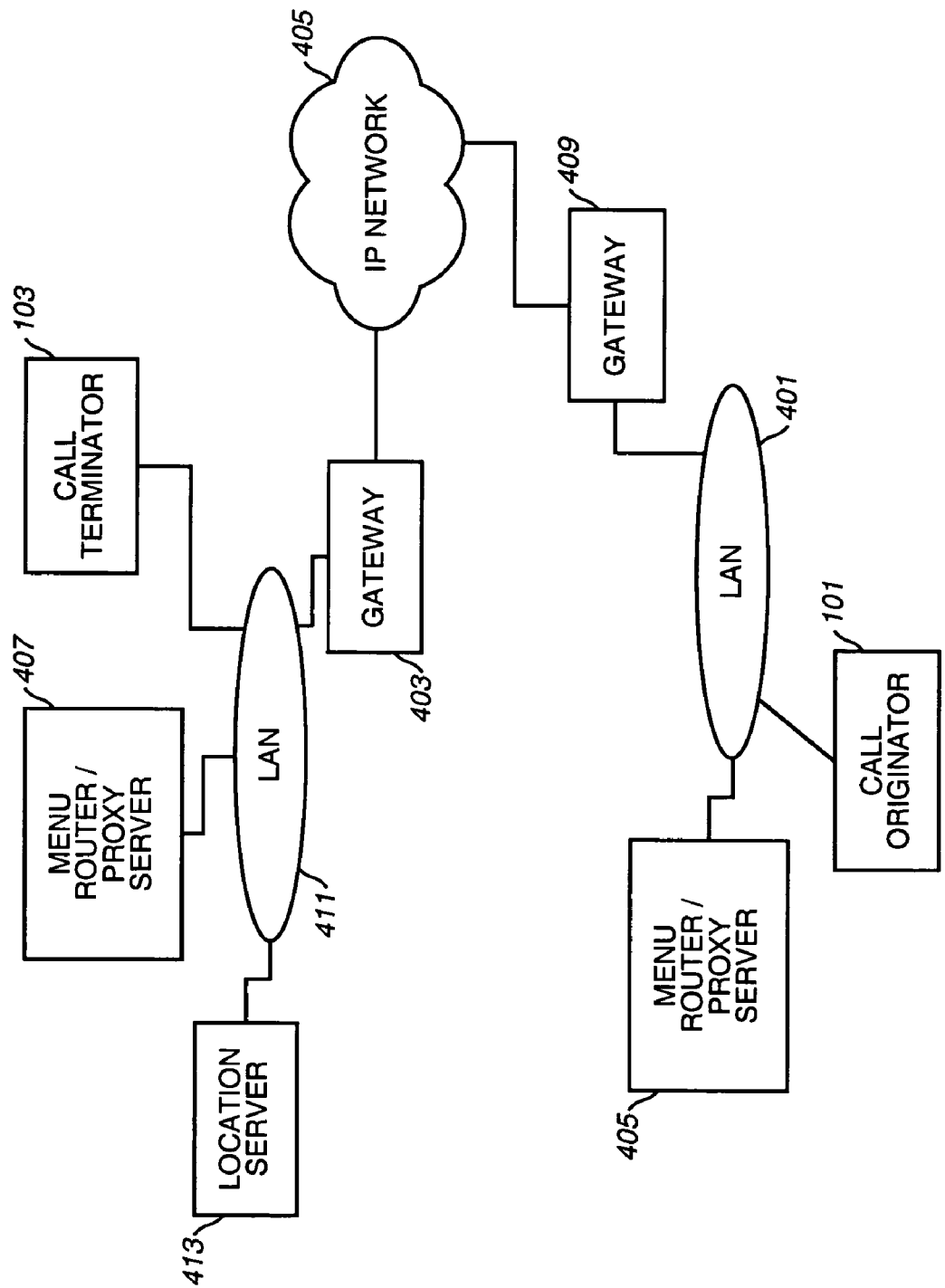
FIG. 4 is a diagram of an exemplary network of menu routers, according to one embodiment of the present invention.

FIG. 4 shows a computer network associated with the call originator in implementing SIP, according to an embodiment of the present invention. Call originator 101, which in this exemplary embodiment is a PC, is attached to LAN 401. However, it is recognized that the call originator 101 can be any device that is capable of supporting IP voice. LAN 401 can be any type of network, including Ethernet. Token Ring, FDDI (Fiber Distributed Data Interface), or ATM (Asynchronous Transfer Mode). In this exemplary network, the call originator (as a User Agent Client) 101 communicates with a menu router/proxy server 405, which acts as a UAS.

The menu router 405 offers call originator 101 a menu of choices that invoke various call processing actions. Additionally, menu router 405 launches specific menu scripts according to the request message that is sent by call originator 101. The menu router 405 provides media proxy and media mixing and can perform as a proxy server according to the menu scripts. Because the menu router 405 has the capability to behave as a proxy server, the menu router 405 is also designated as a menu router/proxy server. Although the menu router 405 is shown as a part of the same network as the call originator 101, the menu router 405 may exist anywhere within the same network domain as the call originator.

When UAC 403 issues a request, call originator 101 first locates a proxy server 405 using the IP address of the proxy server 405. Assuming the VOIP call is destined for call terminator 103, proxy server 405 forwards a request from call originator 101 to proxy server 407. To reach proxy server 407, the request travels over LAN 401 to a gateway 409, which provides an interface to IP network 105. After traversing the IP network 105, the request emerges at another gateway 403, which is attached to LAN 411, where the request is retrieved by proxy server 407. Proxy server 407 then communicates with a location server 413 to determine the location of call terminator 103.

Figure 5:
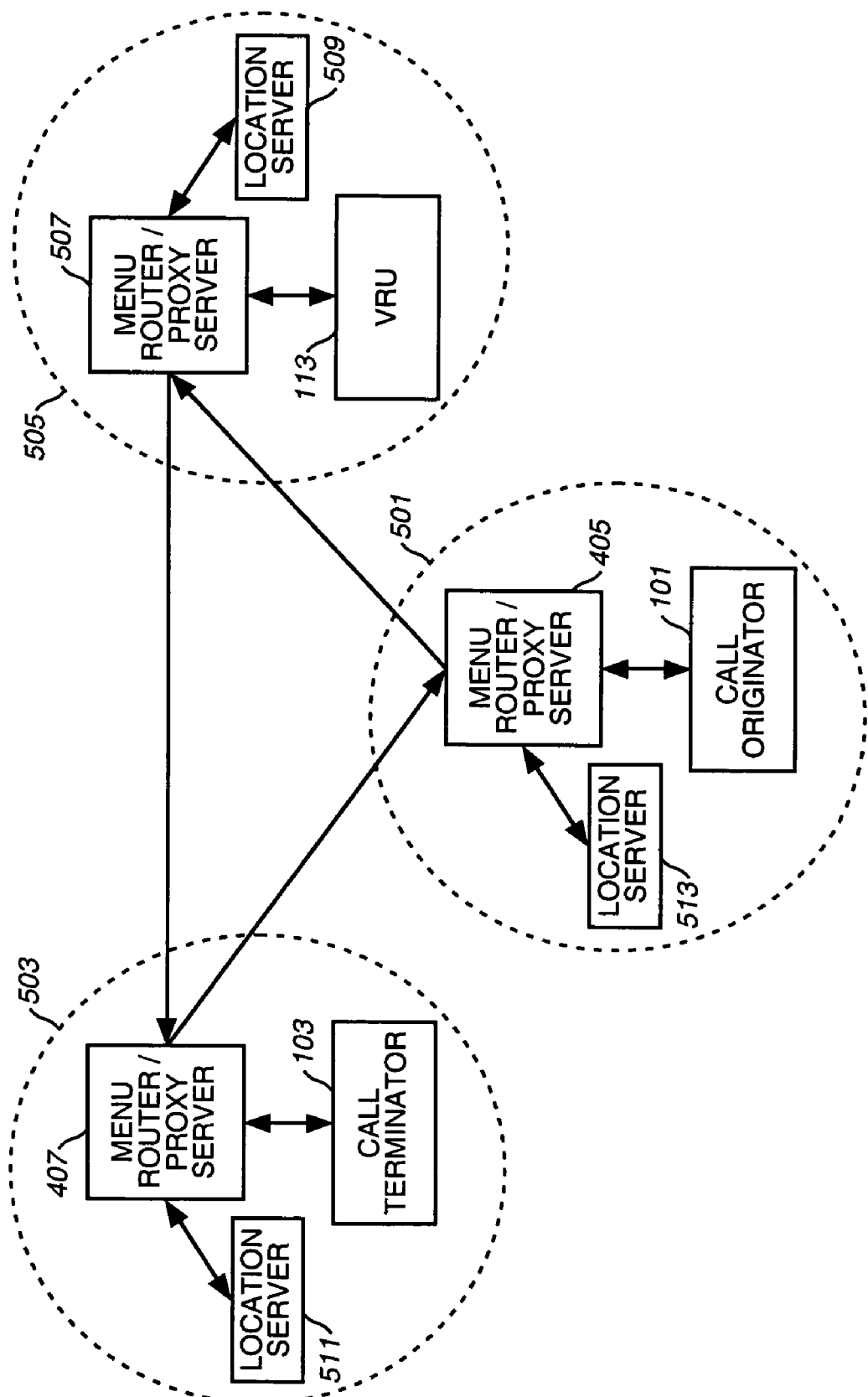
FIG. 5 is a diagram illustrating the interaction between the call originator, call terminator, and the voice response unit (VRU) in the system of FIG. 1.

Attention is now drawn to a VOIP call involving VRU 113, as shown in FIG. 5. For explanatory purposes, it is assumed that the call originator 101, the call terminator 103, and the VRU 113 belong to separate domains 501, 503, and 505, respectively. Within domain 501, call originator 101 sends a request to establish a call with VRU 113 to menu router/proxy server 405, which in turn communicates with menu router/proxy server 507 of domain 505. The proxy server 507 notifies VRU 113 of the request by call originator 101. Upon receiving the request from call originator 101, proxy server 507 inquires location server 509 for the address of VRU 113. If VRU 113 is able to accept the request (i.e., has available ports), VRU 113 issues an acknowledgment back to call originator 101. Consequently, a successful connection has been made between call originator 101 and VRU 113, and thus, VRU 113 can begin the process of digit collection, as previously discussed.

Upon completion of the digit collection from call originator 101, VRU 113 issues a request to proxy server 507 to establish a call-leg with call terminator 103 within domain 503. After receiving the request from the VRU 113, proxy server 407 queries location server 511 to determine the address of call terminator 103. Subsequently, call terminator 103 receives the request and acknowledges, thereby establishing a call-leg between call terminator 103 and VRU 113. Having established this second call-leg, VRU 113 binds the first call-leg from call originator 101 to this second call-leg to permit the communication between call originator 101 and call terminator 103. VRU 113 then drops from the call. By dropping from the call, VRU 113 frees up its ports to process other voice calls. It should be noted that within domain 501, there exists a location server 513 to process calls for device 101; in actual implementation, call originator 101 can also behave as a call terminator within the single device.

The system of FIG. 5 employs SIP to exchange messages among domains 501, 503, and 505. A detailed discussion of SIP and its call control services are described in IETF RFC 2543 and IETF Internet draft "SIP Call Control Services", Jun. 17, 1999; both of these documents are incorporated herein by reference in their entirety. SIP messages are either requests or responses. The User Agent Clients issue requests, while the User Agent Servers provide responses to these requests. SIP defines six types of requests, which are also referred to as methods. The first method is the INVITE method, which invites a user to a conference. The next method is the ACK method, which provides for reliable message exchanges for invitations in that the client is sent a confirmation to the INVITE request. That is, a successful SIP invitation includes an INVITE request followed by an ACK request.

Another method is the BYE request, which indicates to the UAS that the call should be released. In other words, BYE terminates a connection between two users or parties in a conference. The next method is the OPTIONS method; this method solicits information about capabilities and does not assist with establishment of a call. Lastly, the REGISTER provides information about a user's location to a SIP server.

Figure 6:
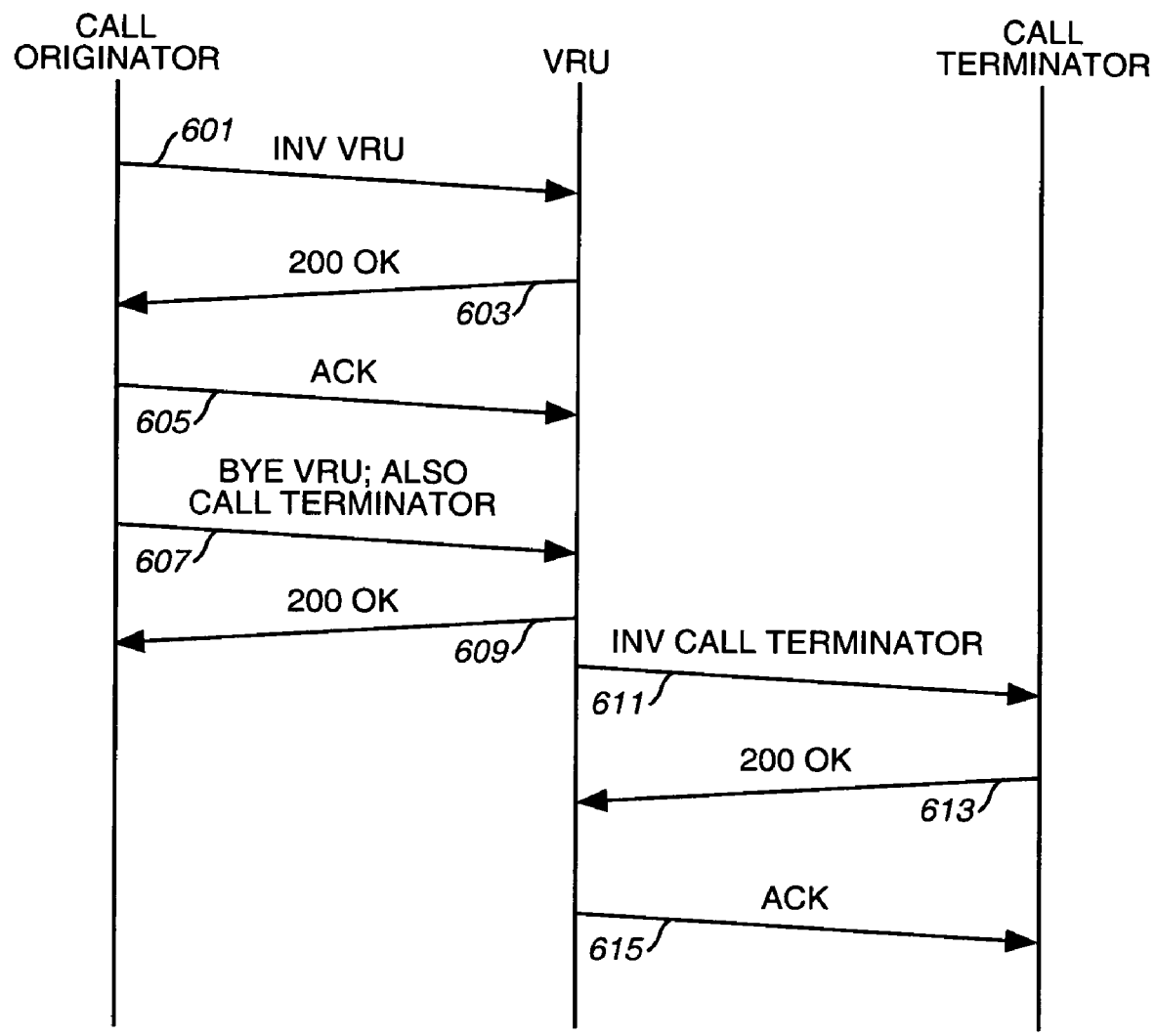
FIG. 6 is a flow diagram of the operation of releasing the VRU in the system of FIG. 1.

FIG. 6 shows the operation involving the use of a VRU to establish a call between a call originator 101 and a call terminator 103, utilizing SIP. It should be noted that FIG. 6 provides a simplified SIP message flow between call originator 101 and call originator 103 using VRU 113. In step 601, call originator 101 issues an INVITE request to VRU 113. In response, VRU 113 issues a 200 OK message, indicating that the invitation was successful, per step 603. Next, call originator 101, as in step 605, sends an ACK message to VRU 113 to acknowledge the previous message. At this point, call originator 101 and VRU 113 exchange data as necessary.

After the VRU 113 completes processing, call originator 101 issues a BYE VRU message using an Also header to indicate that call originator 101 seeks to establish a call with call terminator 103, per step 607. Next, VRU 113 issues a 200 OK message, as in step 609, to indicate that the previous message was successful.

In turn, VRU 113, as in step 611, sends an INVITE call terminator message to call terminator 103. In step 613, call terminator 103 issues a 200 OK message to VRU 113, which then acknowledges via an ACK message, per step 615. At this point in the call processing, VRU 113 drops out of the voice call, leaving call originator 101 and call terminator 103 to exchange voice messages. Under this arrangement, the valuable network resource, VRU 113, is not unnecessarily tied up for the duration of the voice call between call originator 101 and call terminator 103.

Figure 7:
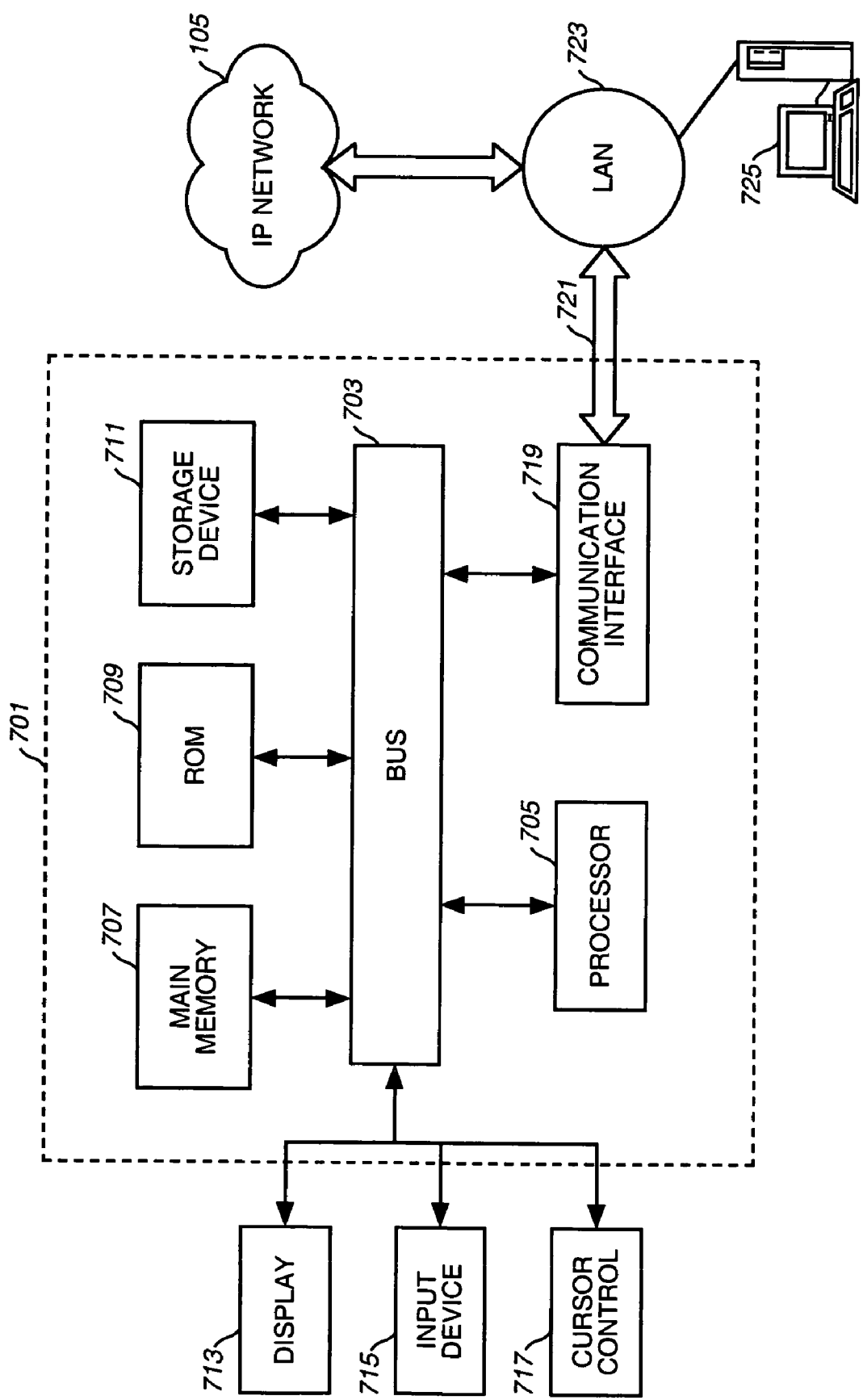
FIG. 7 is a diagram of a computer system that can perform the process of FIG. 6, in accordance with an embodiment of the present invention.
Figure 8:
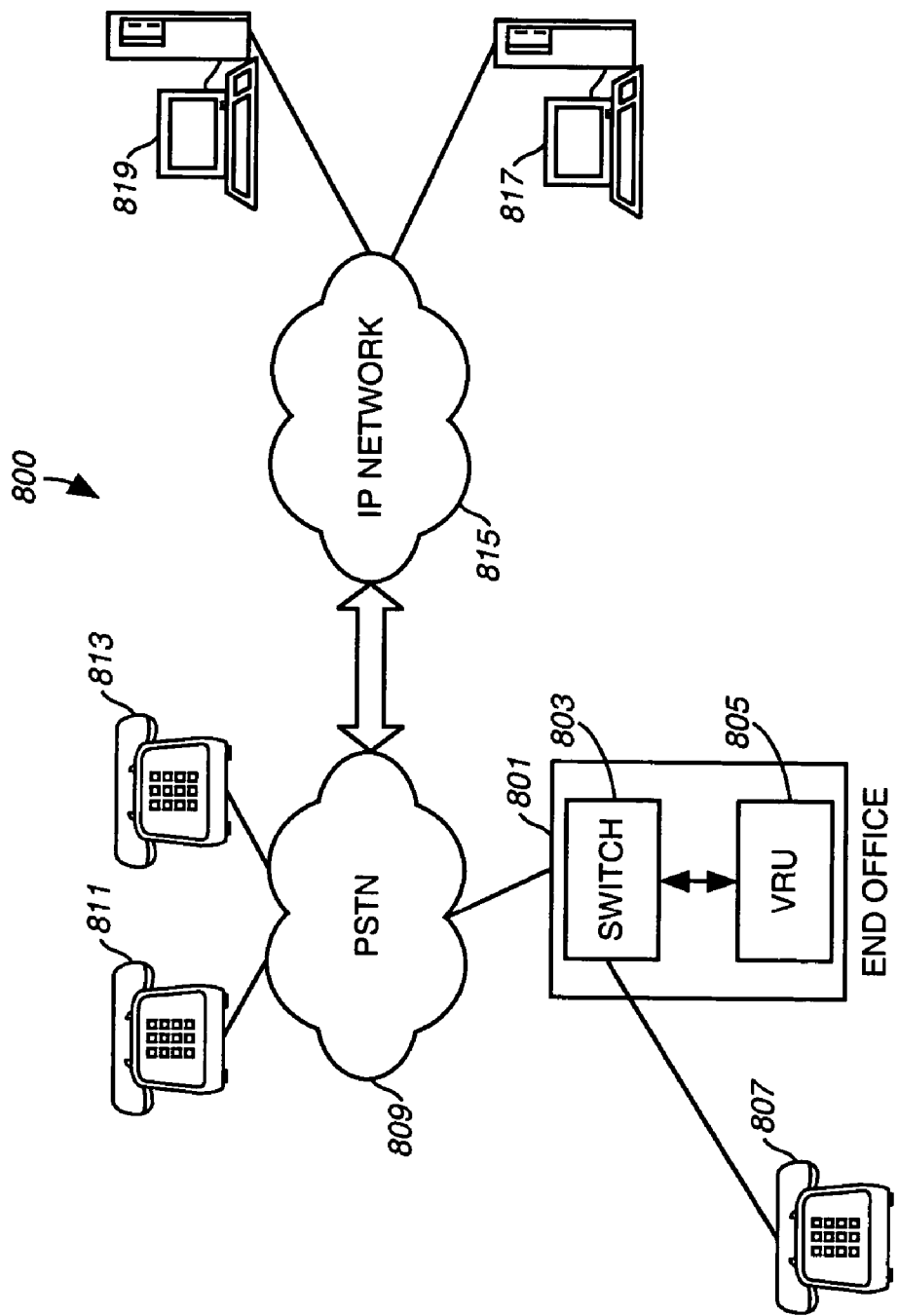
FIG. 8 is a diagram of a conventional IP telephony system.
Figure 9:
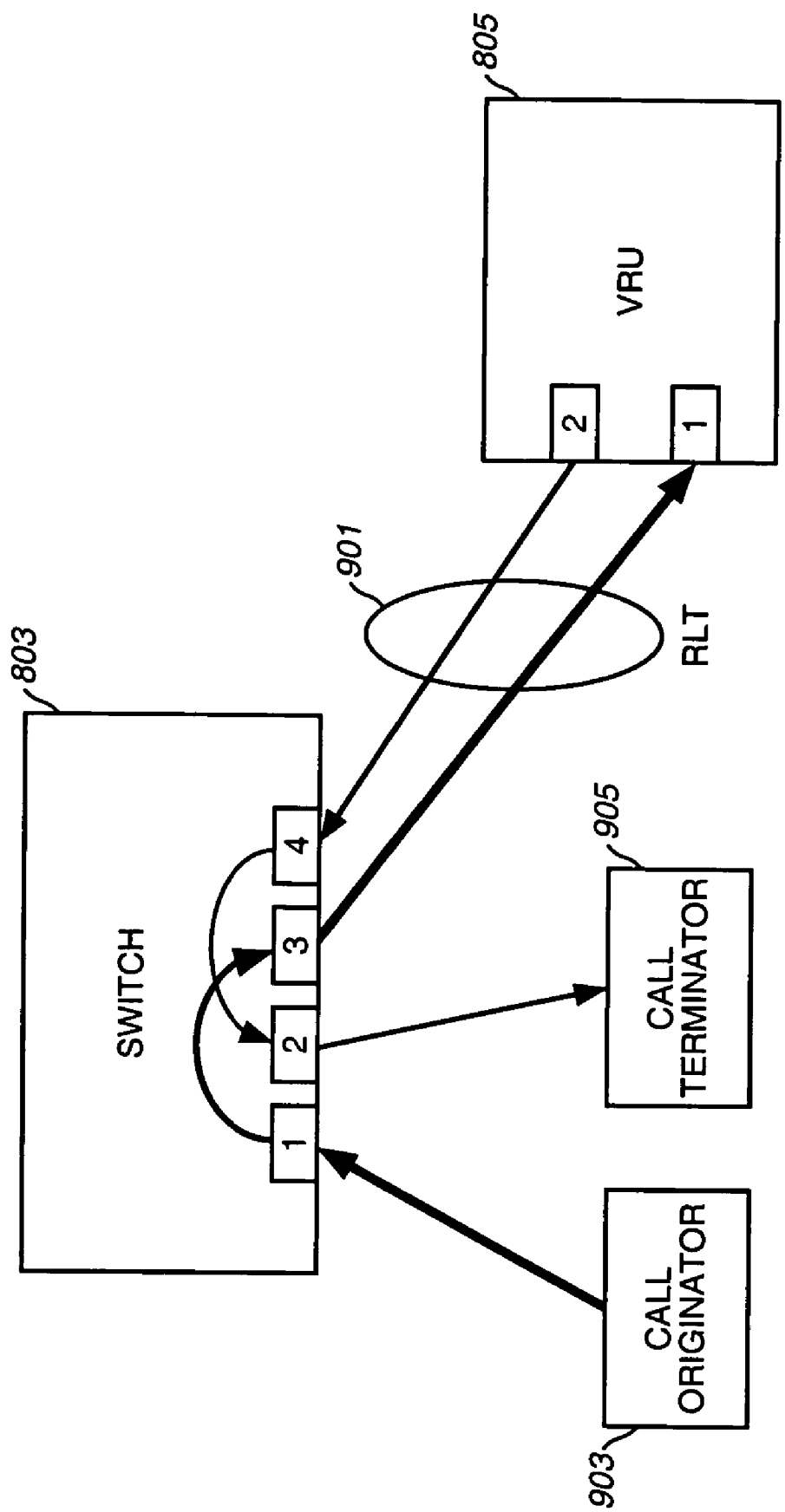
FIG. 9 is a diagram of the release line trunk (RLT) mechanism that is utilized in a traditional PSTN.

FIG. 7 illustrates a computer system 701 upon which an embodiment according to the present invention may be implemented. Computer system 701 includes a bus 703 or other communication mechanism for communicating information, and a processor 705 coupled with bus 703 for processing the information. Computer system 701 also includes a main memory 707, such as a random access memory (RAM) or other dynamic storage device, coupled to bus 703 for storing information and instructions to be executed by processor 705. In addition, main memory 707 may be used for storing temporary variables or other intermediate information during execution of instructions to be executed by processor 705. Computer system 701 further includes a read only memory (ROM) 709 or other static storage device coupled to bus 703 for storing static information and instructions for processor 705. A storage device 711, such as a magnetic disk or optical disk, is provided and coupled to bus 703 for storing information and instructions.

Computer system 701 may be coupled via bus 703 to a display 713, such as a cathode ray tube (CRT), for displaying information to a computer user. An input device 715, including alphanumeric and other keys, is coupled to bus 703 for communicating information and command selections to processor 705. Another type of user input device is cursor control 717, such as a mouse, a trackball, or cursor direction keys for communicating direction information and command selections to processor 705 and for controlling cursor movement on display 713.

Embodiments are related to the use of computer system 701 to control ARU 201 remotely via the transmission of control messages. According to one embodiment, the issuance of SIP messages is provided by computer system 701 in response to processor 705 executing one or more sequences of one or more instructions contained in main memory 707. Such instructions may be read into main memory 707 from another computer-readable medium, such as storage device 711. Execution of the sequences of instructions contained in main memory 707 causes processor 705 to perform the process steps described herein. One or more processors in a multi-processing arrangement may also be employed to execute the sequences of instructions contained in main memory 707. In alternative embodiments, hardwired circuitry may be used in place of or in combination with software instructions. Thus, embodiments are not limited to any specific combination of hardware circuitry and software.

Further, the Sessions Initiation Protocol as well as the instructions to transmit and receive SIP messages may reside on a computer-readable medium. The term "computer-readable medium" as used herein refers to any medium that participates in providing instructions to processor 705 for execution. Such a medium may take many forms, including but not limited to, non-volatile media, volatile media, and transmission media. Non-volatile media includes, for example, optical or magnetic disks, such as storage device 711. Volatile media includes dynamic memory, such as main memory 707. Transmission media includes coaxial cables, copper wire and fiber optics, including the wires that comprise bus 703. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 705 for execution. For example, the instructions may initially be carried on a magnetic disk of a remote computer. The remote computer can load the instructions relating to the transmission of SIP messages to control call processing remotely into its dynamic memory and send the instructions over a telephone line using a modem. A modem local to computer system 701 can receive the data on the telephone line and use an infrared transmitter to convert the data to an infrared signal. An infrared detector coupled to bus 703 can receive the data carried in the infrared signal and place the data on bus 703. Bus 703 carries the data to main memory 707, from which processor 705 retrieves and executes the instructions. The instructions received by main memory 707 may optionally be stored on storage device 711 either before or after execution by processor 705.

Computer system 701 also includes a communication interface 719 coupled to bus 703. Communication interface 719 provides a two-way data communication coupling to a network link 721 that is connected to a local network 723. For example, communication interface 719 may be a network interface card to attach to any packet switched local area network (LAN). As another example, communication interface 719 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 719 sends and receives electrical, electromagnetic or optical signals that carry digital data streams representing various types of information.

Network link 721 typically provides data communication through one or more networks to other data devices. For example, network link 721 may provide a connection through local network 723 to a host computer 725 or to data equipment operated by a service provider, which provides data communication services through the IP network 105. LAN 723 and IP network 105 both use electrical, electromagnetic or optical signals that carry digital data streams. The signals through the various networks and the signals on network link 721 and through communication interface 719, which carry the digital data to and from computer system 701, are exemplary forms of carrier waves transporting the information. Computer system 701 can send SIP messages and receive data, including program code, through the network(s), network link 721 and communication interface 719.

The techniques described herein provide several advantages over prior approaches to call processing in which a VRU 113 is needed to establish a VOIP call between call originator 101 and call terminator 103. The present invention presents an efficient and economically feasible approach to processing VOIP calls involving a VRU 113. The VRU 113 drops from the voice call after binding the two call-legs of the call originator 101 and the call terminator 103.

Obviously, numerous modifications and variations of the present invention are possible in light of the above teachings. It is therefore to be understood that within the scope of the appended claims, the invention may be practiced otherwise than as specifically described herein.

What is claimed is:

1. An apparatus for serving as a gateway to process a voice call transported over a packet switched network, the apparatus comprising:
   a network interface configured to receive a request from an originator of the voice call over the packet switched network; and
   a communication interface configured to communicate with a voice response unit that is coupled to a router, wherein the request is for access to the voice response unit in support of the voice call.

2. An apparatus of claim 1, wherein the voice response unit is configured to collect digit information from the originator of the voice call, and to perform authentication and authorizing of the originator of the voice call based on the collected information.

3. An apparatus of claim 1, wherein the packet switched network is an internet protocol (IP) network.

4. An apparatus of claim 1, wherein the packet switched network is a public data network.

5. An apparatus of claim 1, wherein the router is configured to provide the originator of the voice call a menu of choices corresponding to call processing actions.

6. An apparatus of claim 1, wherein the router is configured to serve as a user agent client according to a Session Initiation Protocol (SIP).

7. An apparatus of claim 1, wherein the voice response unit communicates with a public switched telephone network.

8. A method for processing a voice call transported over a packet switched network, the method comprising:
- receiving a request, at a gateway, from an originator of the voice call over the packet switched network, wherein the request is for access to a voice response unit coupled to the gateway; and
- communicating with a router coupled to the gateway in support of the voice call.

9. A method of claim 8, wherein the voice response unit is configured to collect digit information from the originator of the voice call, and to perform authentication and authorizing of the originator of the voice call based on the collected information.

10. A method of claim 8, wherein the packet switched network is an internet protocol (IP) network.

11. A method of claim 8, wherein the packet switched network is a public data network.

12. A method of claim 8, wherein the router is configured to provide the originator of the voice call a menu of choices corresponding to call processing actions.

13. A method of claim 8, wherein the router is configured to serve as a user agent client according to a Session Initiation Protocol (SIP).

14. A method of claim 8, wherein the router is configured to query a location server for location of a terminator of the voice call.

15. A method of claim 8, wherein the voice response unit communicates with a public switched telephone network.

16. A method for establishing a voice call over a packet switched network via a voice response unit, the method comprising:
- receiving a request, at the voice response unit, from an originator of the voice call over the packet switched network for establishing the voice call with a terminator of the voice call; and
- generating a message to establish communication with the terminator of the voice call in response to the request, wherein the voice response unit couples to a gateway and a router.

17. A method of claim 16, wherein the voice response unit is configured to collect digit information from the originator of the voice call, and to perform authentication and authorizing of the originator of the voice call based on the collected information.

18. A method of claim 16, wherein the packet switched network is an internet protocol (IP) network.

19. A method of claim 16, wherein the packet switched network is a public data network.

20. A method of claim 16, wherein the router is configured to provide the originator of the voice call a menu of choices corresponding to call processing actions.

21. A method of claim 16, wherein the router is configured to serve as a user agent client according to a Session Initiation Protocol (SIP).

22. A method of claim 16, wherein the router is configured to query a location server for location of the terminator of the voice call.

23. A method of claim 16, wherein the voice response unit communicates with a public switched telephone network.

* * * * *